J. C. WILLIAMSON.
STUMP PULLER.
APPLICATION FILED MAR. 7, 1921.
1,433,165.
Patented Oct. 24, 1922.
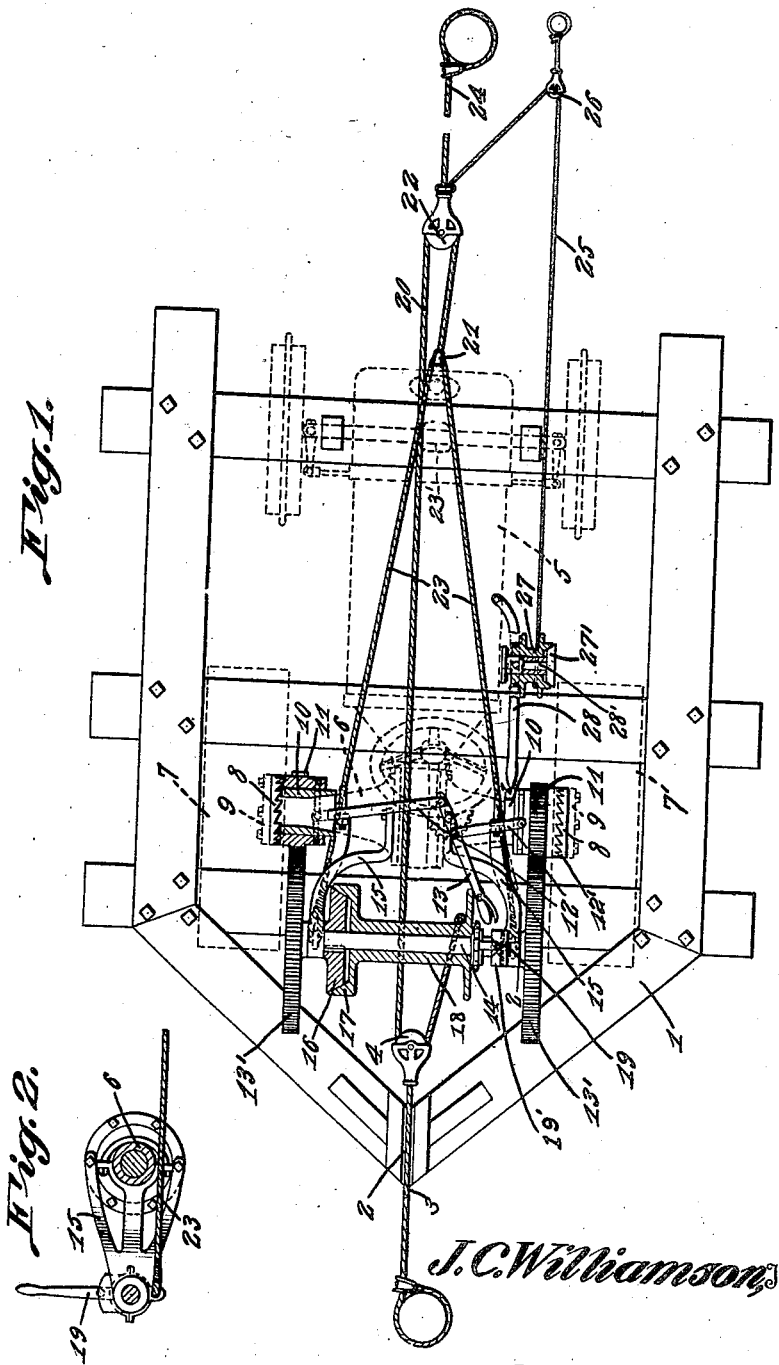

Patented Oct. 24, 1922.

1,433,165

UNITED STATES PATENT OFFICE.

JAMES C. WILLIAMSON, OF CORDELE, GEORGIA.

STUMP PULLER.

Application filed March 7, 1921. Serial No. 450,199.

*To all whom it may concern:*

Be it known that I, JAMES C. WILLIAMSON, a citizen of the United States, residing at Cordele, in the county of Crisp and State of Georgia, have invented a new and useful Stump Puller, of which the following is a specification.

The present invention relates to stump extracting machines, and more particularly to machines of this type employing a tractor or the like as the power element therof.

It is the principal object of the invention to provide a novel arrangement of gears and cables, so that the machine will automatically align itself with the work, to insure a direct pull on the stump being extracted and increase the efficiency of the machine, by eliminating all lateral strains.

A further object of the invention is the provision of a clutch member designed to compensate for, and relieve the gears or cables of the machine of excessive strain directed thereto during the extracting operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a plan view of a stump pulling machine constructed in accordance with the present invention and disclosing the same as supported on its skid.

Figure 2 is a sectional view taken on line 2—2 of Figure 1.

Referring to the drawing in detail, the device is shown as including the skid indicated generally by the reference character 1, which is provided with a central guide 2, formed at the rear end thereof, which guide accommodates the cables 3, that is looped around a stump as clearly shown by Figure 1 of the drawing, and which carries a pulley 4 at one end thereof.

The skid provides a support for the tractor to permit the tractor to move laterally, Figure 1 of the drawing disclosing the tractor as mounted thereon. In this invention a tractor is employed as the power element, the tractor being indicated in dotted lines and depicted by the reference character 5, and as shown the tractor differential housing 6 provides means by which the drum frame may be secured to the tractor.

The drive axle of the tractor, which imparts rotary movement to the wheels 7 thereof also imparts rotary movement to the drum, to be hereinafter more fully described, through the wheels and clutch elements 8 which are bolted to the flanges 9 of the wheels.

Supported on the differential housing 6 at opposite ends thereof, are the sleeves 10 which are formed integral with the clutch elements 8 and which form bearings for the pinions 11. These pinions 11 are provided with clutch faces 12' that cooperate with the clutch elements 8 for clutching the pinions 11 to the wheels 7 of the tractor, whereby the pinions 11 may be rotated.

The pinions 11 are moved into and out of engagement with the clutch member 8 by means of the opposed links 12 which are connected to the operating lever 13 at points on opposite sides of its pivot point. It follows that when the operating lever 13 is moved, the links 12 are correspondingly moved.

Meshing with the pinions 11 are the relatively large gear wheels 13' keyed to the drum shaft 14, in a manner to impart rotary movement thereto, it being understood that the curved arms of the frame 15 which embrace portions of the shaft 14, support the gear wheels 13' in proper relation with the pinions 11.

A friction clutch member 16 is keyed to the shaft 14 to move therewith, the clutch member being shown as cooperating with the clutch member 17 forming a part of the drum 18, which is loosely mounted on the shaft 14. It is to be understood that the clutch embodying the members 16 and 17, clutches the drum 18 to its shaft 14 and provides a compensating device to give, under excessive strains directed to the drum 18, to eliminate the possibility of stripping the gears of the machine or breaking the cables thereof.

Adjacent to the opposite end of the shaft 14 is a suitable clutch mechanism indicated at 19 adapted to be moved into engagement with the clutch mechanism 19' carried on shaft 14 whereby rotary movement of one gear wheel 13' may be imparted to the shaft 14 at the will of the operator.

The power cable 20 has one end thereof connected to the drum 18, the opposite end thereof being provided with a hook member 21, the intermediate portion of the cable 20 operating over the pulleys 4 and 22. The hook member 21 is hooked over the cable 23, which has its ends anchored to the frame that supports the drum and gearing employed for operating the same. This cable is held against lateral movement by contact with the motor supporting bracket 23', which usually supports the motor or body portion of the tractor in spaced relation with the axle thereof.

The pull cable 24 supports the pulley 22, and connects the power cable 20 to the stump under operation, it being understood that the cable 3 which also connects with the power cable 20, is anchored around a stump in a well known manner.

A rehaul line indicated at 25 operates over a pulley 26 and has connection with the cable 24 at one of its ends, the opposite end of the line 25 being secured to the drum 27 which is mounted on the pulley shaft housing and designed to receive motion through the frictional clutch 27' which connects the shaft 28' with the pulley. The drum 27 may be thrown into and out of operation by means of the clutch lever 28. Thus it will be seen that after the machine has accomplished the pulling of a stump, the rehaul line may be brought into operation to play the cable off of the drum 18, rendering the device ready for another stump pulling operation.

In the operation of the device, the tractor is jacked up off of its wheels, permitting the wheels to revolve. The cables are positioned over their respective stumps, regardless of the position of the skid and tractor supported thereon. It is obvious that when power is applied to the drum, to wind the cable 20 thereon, the pulley 4 will center itself opposite the guide 2, to the end that the machine will automatically adjust itself in direct alignment with its work, thereby insuring a direct and positive pull on the stump being extracted.

It might be further stated that due to the manner of supporting the power cable 23, lateral movement of the cable 23 is eliminated, since if a lateral strain is directed thereto, the cable will contact with the motor supporting bracket 23', causing the machine to align with its work.

Having thus described the invention, what is claimed as new is:—

In a stump pulling machine, a skid having a guideway formed at the rear end thereof, a power device supported by the skid, a drum associated with the power device, a cable having one end thereof secured to the drum, the opposite end of the cable being anchored to the power device, means having connection with the cable and passing through the guide way of the skid for permitting the cable to feed onto the drum from the rear of the power device, and clutching means for clutching the drum into and out of operation.

In testimony that I claim the foregoing as my own, I have hereto affixed my signature in the presence of two witnesses.

JAMES C. WILLIAMSON.

Witnesses:
IVY E. SIMPSON,
AGNES ROCKELLI.